UNITED STATES PATENT OFFICE.

CHARLES ANGUS CLEGHORN, OF WOBURN SANDS, ENGLAND, ASSIGNOR OF ONE-HALF TO THE GAYNER PNEUMATIC COMPANY, LIMITED, OF LONDON, ENGLAND.

PROCESS FOR PRODUCING A WORKING FORM OF TURKISH BIRD-LIME.

1,356,267.   Specification of Letters Patent.   Patented Oct. 19, 1920.

No Drawing.   Application filed December 26, 1918.   Serial No. 268,405.

*To all whom it may concern:*

Be it known that I, CHARLES ANGUS CLEGHORN, a subject of the King of England, residing at Woburn Sands, Bedfordshire, England, have invented certain new and useful Improvements in Processes for Producing a Working Form of Turkish Bird-Lime, of which the following is a specification.

This invention is for improvements in or relating to materials, or the process of producing materials, for coating substances to protect them or render them non-porous, and has for its object to provide means whereby the material known as "Turkish birdlime", or some similar substance prepared from the fruits of the trees of the *Cordiaceæ* known botanically as "*Cordia Myxa*" and "*Cordia Latifolia*", may be brought to a condition enabling it to be easily applied to materials for rendering them fluid-proof or for other purposes without its properties being detrimentally changed.

"Turkish birdlime" as imported into this country is too thick to enable it to be readily spread and it would be quite impossible to apply it, for example, with a brush. If it could be easily spread it could be applied in a thin coating to canvas or other materials to render them fluid-proof and it would then be especially useful for manufacturing petrol-tanks of porous materials, such as canvas, or materials which are attacked by petrol, such as rubber.

Turkish birdlime comes mainly from Beyrout. A reference to this material may be found on pages 20 and 639 in the book of Maiden entitled "*Useful Native Plants of Australia*". Also, a comparatively full description of Turkish birdlime appears in the "*Bulletin of Miscellaneous Information*", No. 7, 1918, issued by the Royal Botanic Gardens, Kew, England.

According to this invention, the process for producing a working form of "Turkish birdlime" comprises heating the "Turkish birdlime" to about 180° F. and mixing gradually therewith alcohol.

Prior to adding the alcohol, there may be mixed with the "Turkish birdlime", a solution of borax, or hot water alone, to loosen the material so that it can be easily stirred for the purpose of allowing the alcohol to be intimately mixed therewith.

The ingredients need to be well mixed together and it is found that the borax or the hot water lessens the stiffness of the "Turkish birdlime" so that it can be stirred, for example, by a mechanical stirrer, and then the alcohol can be incorporated.

When the material is cold, it can be applied with a brush and dries to a tacky but firm consistency.

It has before been proposed to thin "Turkish birdlime" by heating it and stirring in boiling water, but to obtain the required consistency for the purpose of this invention boiling water must not be used, as water at this temperature is detrimental to the birdlime.

According to one method of carrying out this invention, to 2 parts by weight of "Turkish birdlime" heated to about 180° F., a 2½% solution of borax previously heated to about the same temperature, is added in the proportion of 3 parts by weight and the whole is thoroughly mixed. The mixture is allowed to cool to about 150° F., *i. e.*, just below the boiling point of alcohol, and there is then added very gradually about 2.5 parts by weight of alcohol, the mixture being stirred thoroughly the whole time.

The birdlime should be first heated and then the solution of borax at about the same temperature gradually added. When the alcohol is added, the combined mixture must be immediately thoroughly stirred or shaken together in a closed vessel.

If borax is not used, hot water at a temperature not higher than 190° F., and preferably about 180° F. can be used for the preliminary thinning, but the borax solution gives better results.

Other materials may be incorporated to vary the consistency of the "Turkish birdlime" according to requirements, for example diatomaceous earths or shellac, or both, or dextrin, may be added to the birdlime thinned according to the above process.

It will be appreciated that the quantities of the ingredients may be varied, those given by way of example being medium quantities. It is found that the temperature of the "Turkish birdlime" or any solution added to it, should not be allowed to exceed 190° F. or be less than about 150°. It is desirable to use as little borax as possible, only sufficient being employed to enable comparatively easy stirring prior to mixing with alcohol.

What I claim as my invention and desire to secure by Letters Patent is:—

1. A process for producing a working form of "Turkish birdlime" comprising raising the temperature of the "Turkish birdlime" to about 180° F. and mixing gradually therewith alcohol, while stirring.

2. A process for producing a working form of "Turkish birdlime" comprising raising the temperature of the "Turkish birdlime" to about 180° F., adding thereto water at a temperature of about 180° F., and finally stirring gradually into the "Turkish birdlime" and water, alcohol.

3. A process for producing a working form of "Turkish birdlime" comprising raising the temperature of the "Turkish birdlime" to about 180° F., adding thereto water containing borax in solution at a temperature of about 180° F., and finally stirring gradually into the "Turkish birdlime" and water, alcohol.

4. A process for producing a working form of "Turkish birdlime" comprising raising 2 parts by weight of "Turkish birdlime" to a temperature of about 180° F., adding a 2½% solution of borax thereto in the proportions of 3 parts by weight, which solution is raised to a temperature of approximately 180° F. before adding it, and then adding 2.5 parts by weight of alcohol, and stirring the whole.

5. A process for producing a working form of "Turkish birdlime" comprising raising the temperature of the "Turkish birdlime" to about 180° F. and mixing gradually therewith alcohol, while stirring and incorporating in the "birdlime" thus thinned, diatomaceous earth.

6. A process for producing a working form of "Turkish birdlime" comprising raising the temperature of the "Turkish birdlime" to about 180° F. and mixing gradually therewith alcohol while stirring and incorporating in the "birdlime" thus thinned, diatomaceous earth and shellac.

In testimony whereof I affix my signature.

CHARLES ANGUS CLEGHORN.